United States Patent [19]
Suzuki
[11] 3,720,841
[45] March 13, 1973

[54] LOGICAL CIRCUIT ARRANGEMENT

[75] Inventor: Yasoji Suzuki, Kawasaki-shi, Japan
[73] Assignee: Tokyo Shibaura Electric Co., Ltd., Kawasaki-shi, Japan

[22] Filed: Dec. 28, 1971
[21] Appl. No.: 212,936

[52] U.S. Cl. ..............................307/221 C, 307/251
[51] Int. Cl. ..............................G11c 19/00
[58] Field of Search...307/205, 221 C, 251, 279, 304

[56] References Cited

UNITED STATES PATENTS 3,609,392 9/1971 Tetik ..............................307/221 C
3,431,433 3/1969 Ball ..............................307/304

*Primary Examiner*—Herman Karl Saalbach
*Assistant Examiner*—R. E. Hart
*Attorney*—Solon B. Kemon et al.

[57] ABSTRACT

A logical circuit arrangement is comprised by a switching circuit including a first logic unit constituted by insulated gate field effect transistors of one conductivity type channel and a second logic unit constituted by insulated gate field effect transistors of the other conductivity type channel; a shift register applied with the output switching circuit and including a plurality of bit elements, each constituted by first and second cascade connected complementary inverters which are composed of insulated gate field effect transistors of the complementary conductivity type channel; a complementary buffer circuit connected to the output from the buffer circuit to the first and second logic units; and a circuit for applying a logical input data signal, a control pulse and a complement signal of the control signal to the gate electrodes of the insulated gate field effect transistors of the switching circuit respectively for selectively switching the polarity of the logical output of the first and second logic units to supply said shift register with said input data signal or an output signal of said buffer circuit in accordance with said control pulse and the complemental pulse of the control pulse.

4 Claims, 3 Drawing Figures

FIG. I

LOGICAL CIRCUIT ARRANGEMENT

Figure 1:
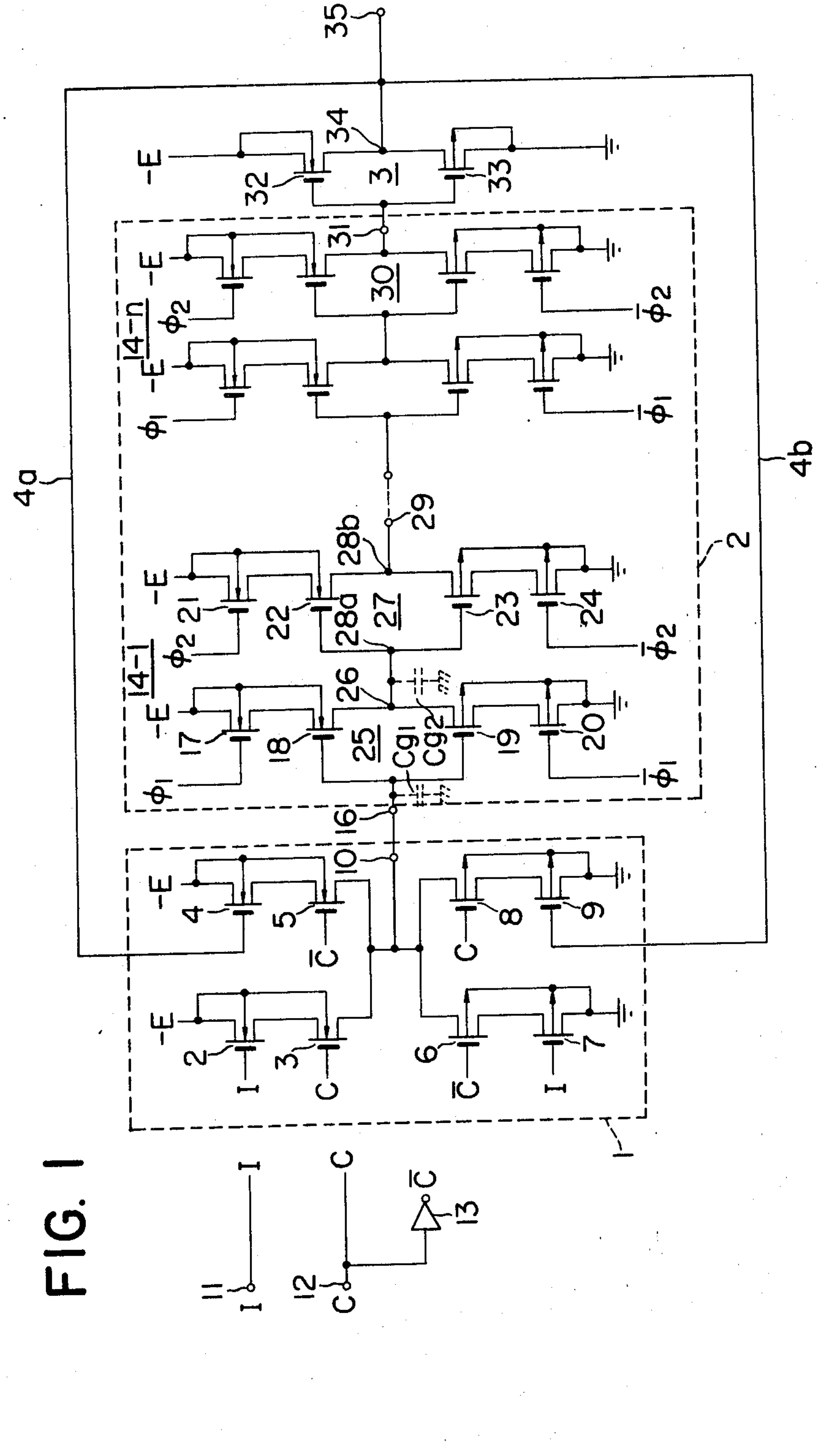

This invention relates to a logical circuit arrangement and more particularly to a logical circuit arrangement constituted by insulated gate field effect transistors and which can be used either as a shift register or a memory.

In a desk type electronic computer, for example, for the purpose of temporarily storing information being computed, it is usual to provide a shift register in the operation circuit. Such a shift register may be formed as an integrated circuit including insulated-gate field effect transistors (IGFET). However, the prior art shift register constituted by an IGFET is required to use a large number of IGFET. Moreover, when these IGFET are fabricated as a large scale integrated circuit, the arrangement and wiring between these IGFET are extremely complicated and difficult to construct provision of lead wires for connecting the IGFET to the external circuit is also difficult. Where a logical circuit is added for permitting use of the shift register as a memory the circuit construction becomes more complicated. Especially, when designing a high density integrated circuit such as a large scale integrated circuit (LSI), the layout of the IGFET becomes difficult, thus increasing the cost and dimension of the desk type electronic computer.

Accordingly, it is the object of this invention to provide an improved logical circuit arrangement which can be fabricated as a high density integrated circuit with a relatively small number of insulated gate field effect transistors thus consuming a little power and can be manufactured at a low cost.

According to this invention there is provided a logical circuit arrangement comprising, (1) a switching circuit including a first logic unit having first and second logic elements which are connected in parallel, each of the first and second logic elements including two serially connected insulated field effect transistor of one conductivity type channel, a second logic unit having third and fourth logic elements which are connected in parallel, each one of the third and fourth logic elements including two serially connected insulated gate field effect transistors of the other conductivity type channel, the first and second logic units being connected in series across source terminals, and an output terminal of the switching circuit connected to the node between the first and second logic units, (2) a shift register including a plurality of bit elements, each including cascade connected first and second complementary inverters, each one of the complementary inverters having a pair of insulated gate field effect transistors of the one and the other conductivity type channel, and insulated gate field effect transistors of the one and the other conductivity type channels respectively connected in series with the insulated gate field effect transistors of the one and the other conductivity type channel which constitute the complementary inverters, the shift register operating to successively shift the output from the switching circuit in accordance with first and second clock pulses having a predetermined phase difference and are applied respectively to the first and second complementary inverters, (3) a buffer circuit connected to the output terminal of the shift register and including complementary insulated gate field effect transistors, (4) means to feedback the output from the buffer circuit to the gate electrodes of the insulated gate field effect transistor of the one conductivity type channel of the second and fourth logic elements of the first and second logic units, and (5) a circuit for applying a logical input data signal, and a complementary pulse of the control pulse upon the gate electrodes of the insulated gate field effect transistors of the switching circuit respectively for selectively switching the levels of the logical output from the first and second logic units to supply said shift register with said input data signal or an output signal of said buffer circuit in accordance with said control pulse and said complemental pulse of said control pulse.

Figure 2:
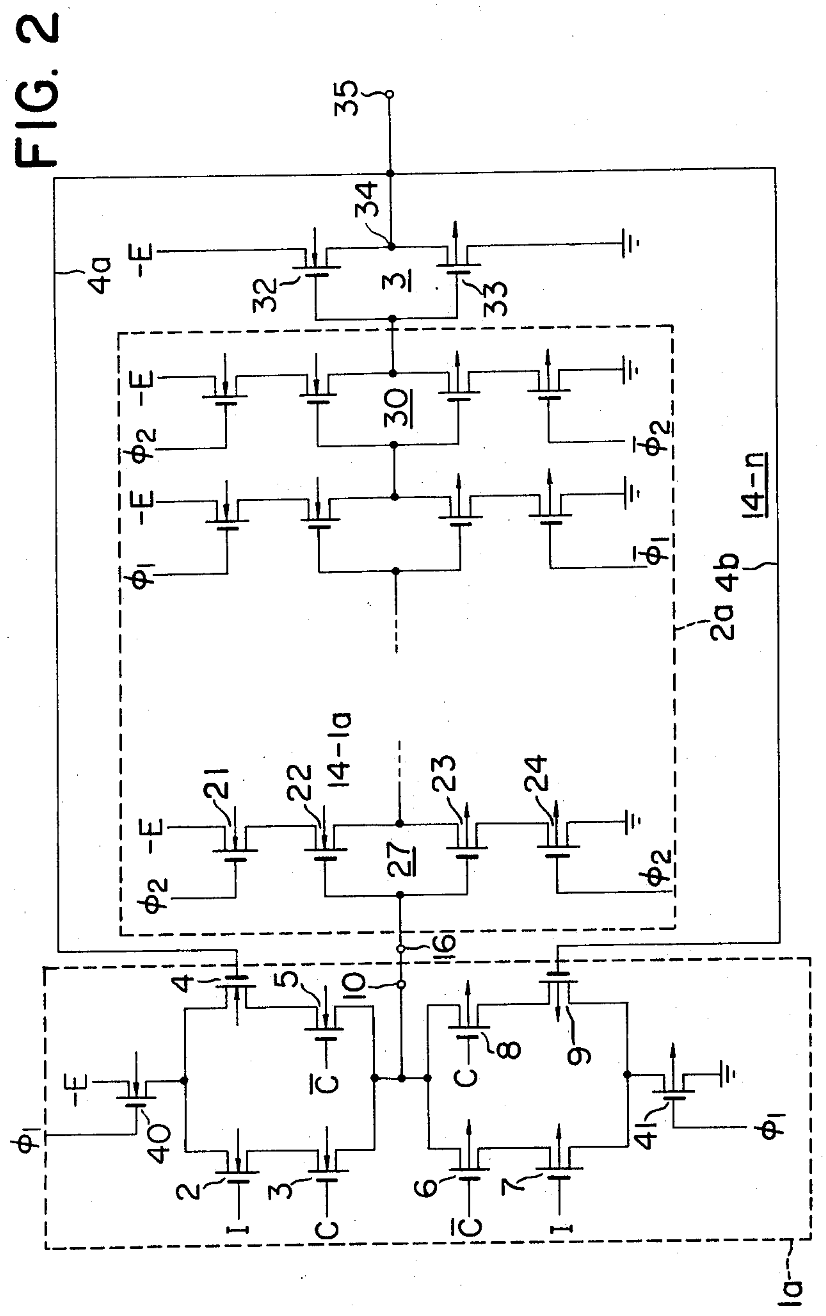
Figure 3:
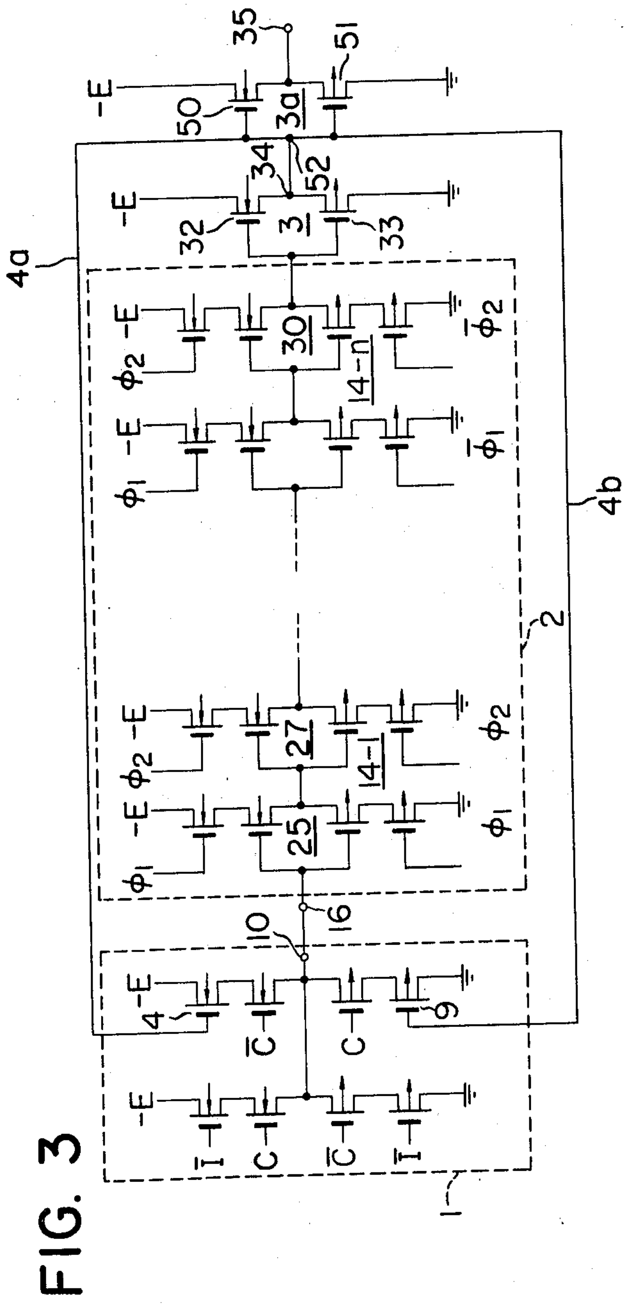

Further objects and advantages of the invention can be more fully understood from the following detailed description taken in conjunction with the accompanying drawings in which:

FIG. 1 shows a schematic diagram of one example of the logical circuit arrangement constructed according to the teaching of this invention; and FIGS. 2 and 3 are schematic diagrams showing modified circuit arrangement of the invention.

A preferred embodiment of this invention shown in FIG. 1 comprises a switching circuit 1 bounded by a dotted line rectangle, a shift register 2, an inverter 3 acting as a buffer circuit and two feedback conductors **4*a* and 4*b* extending between inverter 3 and switching circuit 1**. The logical circuit can be selectively used either as a shift register or a memory.

A first logic unit of the switching circuit 1 is constituted by a first logic element including two serially connected N channel type IGFET's 4 and 5 and connected in parallel with the first logic element. A second logic unit is constituted by a third logic element including two serially connected P type channel IGFET's 6 and 7 and fourth logic element including two serially connected IGFET's 8 and 9 and connected in parallel with the third logic element. The first and second logic units are connected in series between a negative voltage source -E and the ground, and the output terminal 10 of the switching circuit 1 is connected to the nodebetween the first and second logic units. The substrate electrodes of IGFET's 2 to 5 are connected to the negative voltage source -E while the substrate electrodes of IGFET's 6 to 9 are grounded.

The gate electrodes of IGFET's 2 and 7 are connected to an logical data input terminal 11 to apply the logical data input I upon IGFET's 2 and 7. On the other hand, the gate electrodes of IGFET's 3 and 8 are connected to receive a control pulse C through a control pulse input terminal 12, whereas the gate electrodes of IGFET's 5 and 6 are supplied with a complement signal $\overline{C}$ from control pulse input terminal 12 via an inverter 13.

The output terminal 10 of switching circuit 1 is connected to the input terminal 16 of a first bit element 14-1 of shift register 2 comprising n bit elements 14-1 to 14-n inclusive.

The first bit element 14-1 constituted by a first circuit comprising two N channel type IGFET's 17 and 18 and two P channel type IGFET's 19 and 20 respectively connected in series between the negative voltage source -E and the ground, and a second circuit comprising two N channel type IGFET's 21 and 22 and two P channel type IGFET's 23 and 24. The gate electrodes of the N channel type IGFET 18 and the P channel type IGFET 19 of the first circuit are connected to an input terminal 16 to form a first complementary inverter 25, and the output terminal 26 of the first circuit is connected to the input terminal 28*a* of a second complementary inverter 27 having an identical construction. In this manner, the first and second inverters 25 and 27 are connected in cascade.

The substrate electrodes of IGFET's 17, 18, 21 and 22 of the first bit element 14-1 are connected to the negative voltage source -E, whereas the substrate electrodes of IGFET's 19, 20, 23 and 24 are grounded. A positive first clock pulse $\bar{\phi}_1$ is impressed upon the gate electrode of IGFET 20. The positive and negative first clock pulses $\phi_1$ and $\bar{\phi}_1$ have opposite phases and form a continuous rectangular wave pulse. Similarly, upon the gate electrode of IGFET 21 of the second circuit is impressed a positve second clock pulse $\phi_2$ phase-shifted a predetermined angle from the first clock pulse $\phi_1$, and a negative second clock $\bar{\phi}_2$ having the opposite phase with respect to the second clock pulse $\phi_2$ is impressed upon the gate electrode of IGFET 24.

Similarly, it is also possible to operate the shift register 2 by impressing positve first clock pulse $\phi_1$ on the gate electrodes of IGFET's 17 and 24, and negative first clock pulse $\bar{\phi}_1$ on the gate electrodes of IGFET's 20 and 21, respectively.

The output of the first bit element 14-1 is obtained from the output terminal 28*b* of the second inverter 27, which is coupled to the input terminal 29 of the first complementary inverter, not shown, of the second bit elementof the same construction. Like the first element 14-1, each bit element of shift register 2 is comprised by the first and second complementary inverters which are connected in cascade and the output terminal of the second inverter 30 of the last bit element 14-n is connected to the output terminal 31 of the shift register 2.

The output terminal 31 of the shift register 2 is connected to the input terminal of a complementary inverter 3 comprising an N channel type IGFET 32 and a P channel type IGFET 33 which are connected in series between the negative voltage source -E and the ground, the gate electrodes of IGFET's 32 and 33 being interconnected directly. The output terminal 34 of the complementary inverter 3 is connected to the output terminal 35 of the logical circuit arrangement and also to the gate electrode of one IGFET 4 of the second logic element and to the gate electrode of one IGFET 9 of the fourth logic element through feedback conductors 4*a* and 4*b*. The substrate electrodes of all N channel type IGFET's constituting shift register 2 and inverter 3 are connected to the negative voltage source -E, whereas the substrate electrodes of all P channel type IGFET's are grounded.

The embodiment shown in FIG. 1 operates as follows. The N channel type IGFET's become conductive when a positive voltage is applied to their substrate electrode which are connected to the negative voltage source -E, whereas the P channel type IGFET's become conductive when a negative voltage -E is impressed upon their substrate electrodes which are maintained at the ground or zero potential. By denoting the positive voltage by a logical level "1" and the negative voltage (-E) by a logical level "0", the operation of the logical circuit arrangement can be described hereinafter in terms of the positive logic.

When a logical input signal I of "1" level is impressed upon the input terminal 11, IGFET 2 will become ON, whereas IGFET 7 OFF. Under this condition, upon application of a control pulse C of "1" level upon input terminal 12, IGFET's 3 and 6 will become ON, whereas IGFET's 5 and 8 OFF. Consequently, IGFET's 2 and 3 of the first logic element become ON to discharge a capacitor $Cg_1$ to produce a voltage -E that is the "0" level at the output terminal 10. In the same manner, when an input of "0" level is impressed upon input terminal 11 an output of the "1" level will be produced at the output terminal 10. Under these conditions, the second and fourth logic elements are maintained OFF whether the signals feedbacked to IGFET's 4 and 9 from the output terminal 34 of buffer circuit 3 via feedback conductors 4*a* and 4*b* are "1" or "0". As a consequence, when a control pulse C of "1" level is applied upon input terminal 12, the logical input signal I applied to the logical circuit arrangement of this embodiment will be shifted through shift register 2 to appear at the output terminal 35.

The "0" level output appearing at the output terminal 10 is applied to the gate electrodes of the IGFET's 18 and 19 of inverter 25 through terminal 16 thus turning OFF IGFET 18 and ON IGFET 19. On the contrary, upon application of a "1" level output upon inverter 25, IGFET 18 is turned ON while IGFET 19 OFF. Thus for example, when a "0" level output is applied to inverter 25 a capacitor $Cg_2$ is charged by the first clock pulses $\phi_1$ and $\bar{\phi}_1$ to produce an inverted output of "1" level at the output terminal 26 of inverter 25. When this inverted output of "1" level is impressed upon the input terminal 28*a* of inverter 27 from output terminal 26, IGFET 22 becomes ON and IGFET 23 OFF. Then, application of the second clock pulses $\phi_2$ and $\bar{\phi}_2$ upon IGET's 21 and 24 discharges capacitor $Cg_2$ through IGFET's 21 and 22 to produce an inverted output of "0" level at the output terminal 28*b* of inverter 27. In other words, a "0" level signal applied to the input terminal 16 of the first bit element 14-1 will be shifted one bit through shift register 2 by the action of the first and second clock pulses $\phi_1$, $\bar{\phi}_1$, $\phi_2$ and $\bar{\phi}_2$. A "1" level input impressed upon input terminal 16 will be shifted in the same manner. In this manner an input signal of "0" or "1" level impressed upon the input terminal 16 of shift register 2 is sequentially shifted through bit elements 14-1 to 14-n inclusive and finally appears at the output terminal 31 of the second inverter 30 of the last bit element 14-n.

The polarity of the logical output appearing at the output terminal 31 is inverted by the action of inverter 3 and is then supplied to output terminal 35 via terminal 34. At this time, since IGFET's 5 and 8 are OFF, the output of the buffer circuit 3 will not be feedbacked to the switching circuit 1.

In the case where a control pulse C of "0" level is applied upon the input terminal 12, IGFET's 3 and 6 will become OFF whereas IGFET's 5 and 8 ON. Thus, whether the level of the input data impressed upon the logical input terminal 11 is "1" or "0" the first and third logic elements are maintained in their OFF state and either one of the second and fourth logic elements becomes conductive in response to "1" or "0" output level of the buffer circuit 3 thus feedbacking the output from shift register 2 to the switching circuit 1 through feedback conductor 4*a* or 4*b*. Suppose now that a "1"

level data signal appears on the output terminal 34, IGFET 4 becomes ON to apply a "0" level data signal upon the input terminal of shift register 2 which is sequentially shifted through the bit elements 14-1 to 14-n inclusive of shift register 2 and is then feedbacked to the switching circuit from the output side of shift register 2 thereby circulating and storing the data signal in the shift register. The memorizing action is continued during the first and second clock pulses $\phi_1$ and $\phi_2$ and while the "0" level control pulse C is being applied on input terminal 12. In the circuit shown in FIG. 1, capacitors $Cg_1$ and $Cg'2$ are charged and discharged respectively through series circuit of IGFET's 4 and 5; 8 and 9; 17 and 18; and 19 and 20. The time constants of charging and discharging are equal to the product of capacitances of capacitors $Cg_1$ or $Cg_2$ and the resistance of two serially connected IGFET's. However, as the product is extremely small, the operating speed of the illustrated logical circuit is extremely fast.

As above described when the control signal impressed upon input terminal 12 has a level "1", the input information I is written and stored in shift register 2, whereas when the control signal C has a level "0" the output of buffer circuit 3 is circulated and maintained. The stored information can be read out of output terminal 35 at any time.

By denoting the mth information at the input terminal 16 of shift register 2 by *Sm*, the relationship between this information *Sm*, the mth input data and control pulse Cm can be shown by the following logical equation.

$$Sm = Im \cdot Cm + \overline{C}m \cdot I(m+n)$$

where $I(m+n)$ represents a signal appearing at the output terminal 35 which is obtained by delaying information *Im* by *n* bits by the action of shift register 2.

Since the circuit arrangement shown in FIG. 1 is simple and symmetrical and includes relatively small number of component elements, it can be readily fabricated as a high density integrated circuit such as an LSI. In addition, it consumes a little power.

In the modified embodiment shown in FIG. 2, an N channel type IGFET 40 is connected between the first logic unit of the switching circuit 1a and the negative voltage source -E, and a P channel type IGFET 41 is connected between the second logic unit and the ground so as to impress the first clock pulses $\phi_1$ and $\overline{\phi}_1$ upon the gate electrodes of IGFET's 40 and 41, respectively. In this modification, irrespective of the fact that the control pulse C has level "0" or "1", upper application of the first clock pulses $\phi_1$ or $\overline{\phi}_1$, an output appears on the output terminal 10 so that switching circuit 1a operates in the same manner as the combination of the switching circuit 1 and the first inverter 25 of the first bit element 14-1 of the circuit arrangement shown in FIG. 1. For this reason, the first bit element 14-1*a* of the shift register 2a shown in FIG. 2 can be constituted by only the second circuit including the second complementary inverter 27. The arrangement and operation of another component elements of the modification shown in FIG. 2 are identical to those of the embodiment shown in FIG. 1. The embodiment shown in FIG. 2 requires lesser number of the component elements than that shown in FIG. 1 so that it can be fabricated more easily at a lower cost.

In a still further modification shown in FIG. 3, the output from buffer circuit 3 is applied to IGFET's 4 and 9 of the switching circuit 1 and also appears at the output terminal 25 through the second buffer circuit 3*a* connected in cascade with buffer circuit 3. More particularly, the output terminal 34 of buffer c-rcuit 3 is coupled to the node between the gate electrodes of the N and P channel type IGFET's 50 and 51 which constitutes a buffer circuit 3*a*. Although the circuit arrangement shown in FIG. 3 includes additional buffer circuit 3*a*, this modification provides an output having the same level as the output from shift register 2 on the output terminal 35. Of course, such a buffer circuit comprising cascade connected inverters 3 and 3*a* can also be provided for the embodiment shown in FIG. 2.

Although the above embodiments operate on the positive logic, it will be clear that the invention can also be constructed to operate on the negative logic.

It should also be understood that many changes and modifications will be obvious to one skilled in the art without departing from the scope of the invention as defined in the appended claims.

What is claimed is:

1. A logical circuit arrangement comprising, a. a switching circuit including a first logic unit having first and second logic elements which are connected in parallel, each one of said first and second logic elements including two serially connected insulated gate field effect transistors of one conductivity type channel, a second logic unit having third and fourth logic elements which are connected in parallel, each one of said third and fourth logic elements including two serially connected insulated gate field effect transistors of the other conductivity type channel, said first and second logic units being connected in series across source terminals, and an output terminal of said switching circuit connected to the node between said first and second logic units;

b. a shift register including a plurality of bit elements, each including cascade connected first and second complementary inverters, each one of said complementary inverters having a pair of insulated gate field effect transistors of the one and the other conductivity type channels, and insulated gate field effect transistors of the one and the other conductivity type channels respectively connected in series with said insulated gate field effect transistors of the one and the other conductivity type channels which constitute the complementary inverters, said shift register operating to successively shift said output from said switching circuit in accordance with first and second clock pulses having a predetermined phase difference and are supplied respectively to said first and second complementary inverters;

c. a buffer circuit connected to the output terminal of said shift register and including complementary insulated gate field effect transistors;

d. means to feedback the output from said buffer circuit to the gate electrodes of the insulated gate field effect transistors of said one conductivity type channel of said second and fourth logic elements of said first and second logic units; and e. a circuit for applying a logical input data signal, a control pulse and a complementary pulse of said control pulse upon the gate electrodes of said insulated gate field effect transistor of said switching circuit respectively for selectively switching the level of the logical output from said first and second logic units to supply said shift register with said input data signal or an output signal of said buffer circuit in accordance with said control pulse and said complementary pulse of said control pulse.

2. The logical circuit arrangement according to claim 1 wherein said switching circuit includes first and second insulated gate field effect transistors having the same conductivity type channels as said insulated gate field effect transistors of said first and second logic circuit, said first and second insulated gate field effect transistors being connected between said first and second logic units and a source terminal and impressed with said first clock pulse upon the gate electrodes thereof, and wherein the first bit element of said shift register comprises a second complementary inverter connected to receive directly the output from said switching circuit and insulated gate field effect transistors of the one and the other conductivity type channels and are respectively connected in series with said insulated gate field effect transistors of the one and the other conductivity type channels which constitute said second complementary inverter.

3. The logical circuit arrangement according to claim 1 wherein said buffer circuit comprises a single stage complementary inverter constituted by a pair of insulated gate field effect transistors of the opposite conductivity type channels.

4. The logical circuit arrangement according to claim 1 wherein said buffer circuit comprises first and second cascade connected complementary inverters, each including a pair of insulated gate field effect transistors of the opposite conductivity type channels and means for feedbacking the output of said first complementary inverter to the gate electrodes of the insulated gate field effect transistors of said one conductivity type channel of the second and fourth logic elements of said first and second logic units.

* * * * *